United States Patent [19]

Kurokawa et al.

[11] Patent Number: 5,295,639
[45] Date of Patent: Mar. 22, 1994

[54] MECHANISM FOR TRANSMITTING DRIVING FORCE TO RECORDING AND/OR REPRODUCING APPARATUS

[75] Inventors: Toshiya Kurokawa, Chiba; Toshiyuki Yamazaki, Tokyo, both of Japan

[73] Assignee: Sony Corporation, Japan

[21] Appl. No.: 829,577

[22] Filed: Feb. 3, 1992

Related U.S. Application Data

[63] Continuation of Ser. No. 506,082, Apr. 9, 1990, abandoned.

[30] Foreign Application Priority Data

Apr. 28, 1989 [JP] Japan .................. 1-109542
Apr. 28, 1989 [JP] Japan .................. 1-109545

[51] Int. Cl.$^5$ .................................... G11B 15/18
[52] U.S. Cl. ............................. 242/201; 242/200; 360/96.3
[58] Field of Search ............ 242/200, 201; 360/96.3, 360/96.4

[56] References Cited

U.S. PATENT DOCUMENTS

| 4,170,029 | 10/1979 | Kahn | 242/201 |
|---|---|---|---|
| 4,260,120 | 4/1981 | Urata et al. | 242/201 |
| 4,330,098 | 5/1982 | Santoro | 242/201 |
| 4,453,189 | 6/1984 | Ida | 360/96.3 |
| 4,481,551 | 11/1984 | Maeda | 360/96.3 |
| 4,591,935 | 5/1986 | Kouda | 242/201 |
| 4,680,659 | 7/1987 | Imai | 242/201 |
| 4,681,281 | 7/1987 | Aarts et al. | 242/200 |
| 4,711,410 | 12/1987 | Gwon | 242/201 |
| 4,723,184 | 2/1988 | Takai et al. | 360/96.3 |
| 4,819,891 | 4/1989 | Kamijo | 242/201 |
| 4,871,128 | 10/1989 | Tanaka et al. | 242/201 |
| 4,922,357 | 5/1990 | Komatsu et al. | 242/200 |
| 5,003,418 | 3/1991 | Yang . | |

FOREIGN PATENT DOCUMENTS

| 0267756 | 5/1988 | European Pat. Off. . | |
|---|---|---|---|
| 3344292 | 6/1984 | Fed. Rep. of Germany . | |
| 3700890 | 7/1987 | Fed. Rep. of Germany . | |
| 712840 | 1/1980 | U.S.S.R. | 242/200 |
| 2217506 | 10/1989 | United Kingdom . | |

Primary Examiner—Daniel P. Stodola
Assistant Examiner—John Q. Nguyen
Attorney, Agent, or Firm—Ronald P. Kananen

[57] ABSTRACT

A system for supplying driving force to a recording and/or reproducing apparatus includes a first gear train which causes a supply or take-up reel table to rotate at a first speed, and a second gear train which causes the supply or take-up reel table to rotate at a second speed higher than the first speed. By selecting one of these gear trains, the apparatus selectively operates in a FF/REW mode or a high-speed FF/REW mode. In the FF/REW mode, the tape forwarding or rewinding is performed in a tape loaded condition in which tape is arranged in the usual tape traveling path. In the high-speed FF/REW mode, it is performed in a tape unloaded condition in which the tape is arranged at a location other than in the tape traveling path, or is housed within a tape cassette. The system has a torque limiter between a driving source and the first or second gear train. When the apparatus operates in a forward or reverse reproduction mode, the torque limiter acts on the first gear train so as to decrease the rotation speed of the supply or take-up reel table depending upon the load applied to the first gear train.

25 Claims, 7 Drawing Sheets

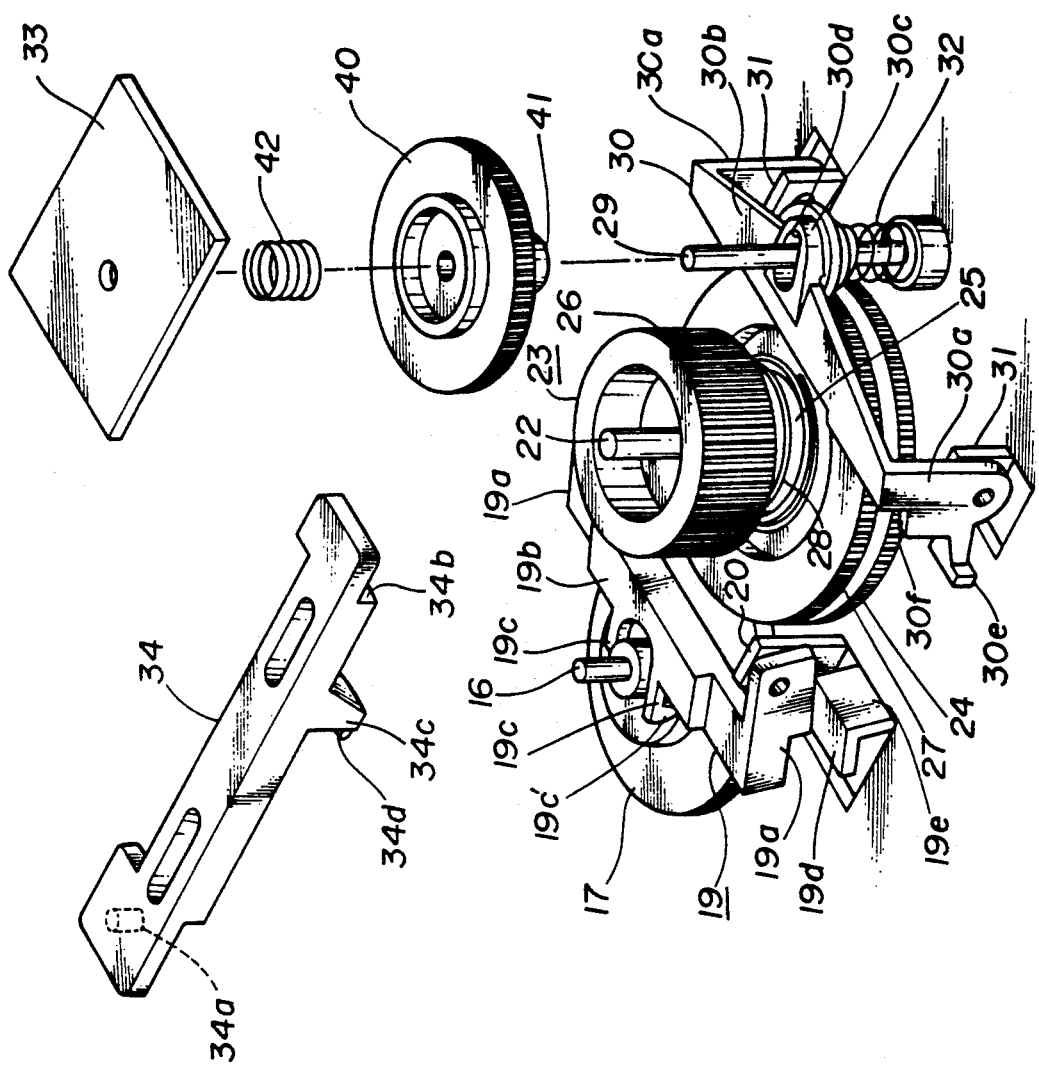

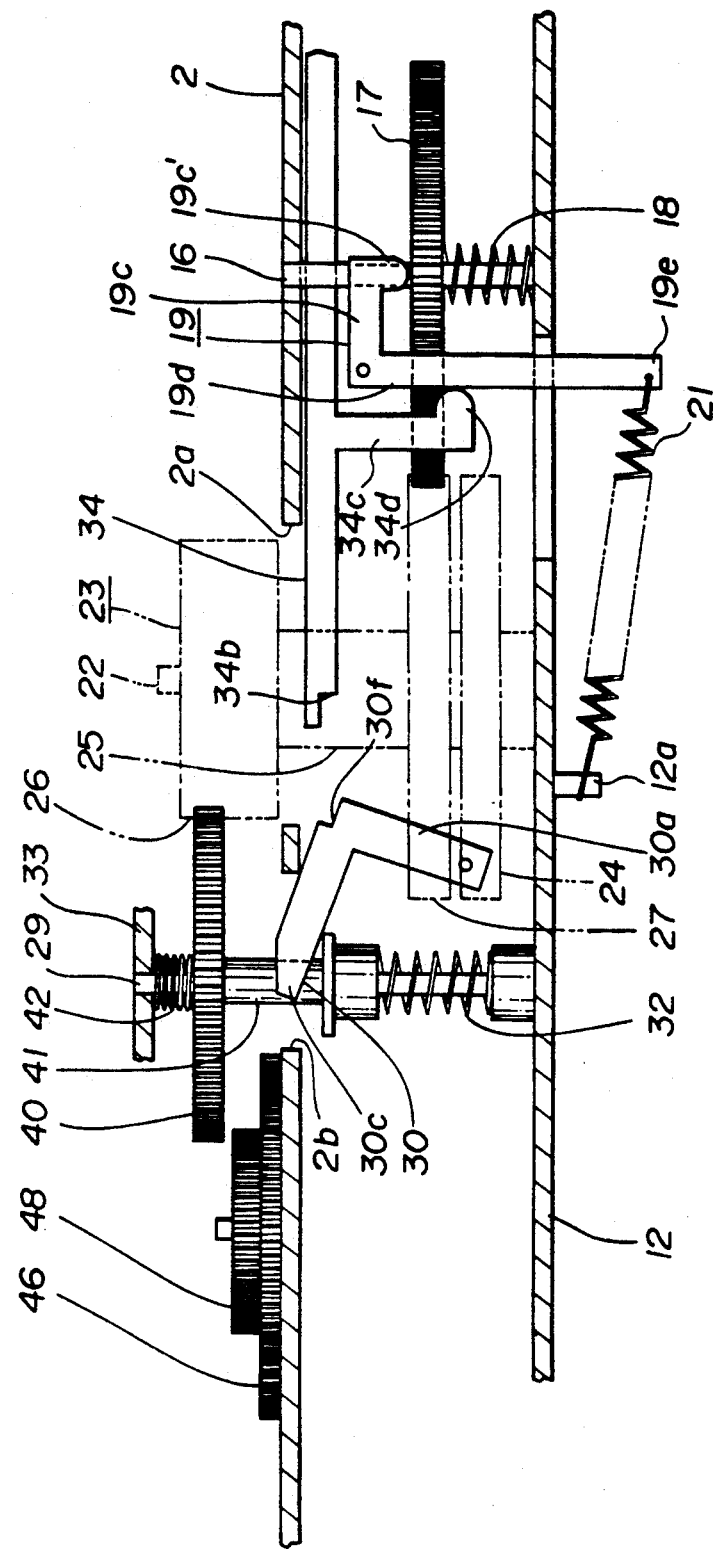

MECHANISM FOR TRANSMITTING DRIVING FORCE TO RECORDING AND/OR REPRODUCING APPARATUS

This application is a continuation of application Ser. No. 07/506,082 filed Apr. 9, 1990, now abandoned.

BACKGROUND OF THE INVENTION

1. Field of The Invention

The present invention relates to a system for supplying driving force to a recording and/or reproducing apparatus. More specifically, the invention relates to a mechanism for transmitting driving force to a recording and/or reproducing apparatus.

2. Description of The Prior Art

In recent years, some recording and/or reproducing apparatus, such as video tape recorders, use a common motor which drives a capstan axle as well as two reel tables in order to make the apparatus more compact.

In such recording and/or reproducing apparatus, the motor causes the capstan axle to rotate clockwise or counterclockwise for causing magnetic tape to travel along a tape traveling path in a forward or reverse direction. The magnetic tape is urged onto the capstan axle by means of a pinch roller so as to travel in dependence upon the rotation of the capstan axle. The motor also causes two reel tables, i.e. a supply reel table, and a take-up reel table to selectively rotate clockwise or counterclockwise via a pendulum gear which is movable between the supply and take-up reel tables. The pendulum gear is engageable with one of the reel tables via corresponding idler gears. With this construction, in order to cause the magnetic tape to travel in the forward direction, for example, the capstan motor rotates counterclockwise, so that the magnetic tape is fed toward the take-up reel table in dependence upon the rotation of the capstan axle. At this time, the pendulum gear engages the take-up reel table via its idler gear so that the take-up reel table rotates clockwise for winding the magnetic tape thereon. On the other hand, in order to cause the magnetic tape to travel in the rearward direction, the capstan motor rotates clockwise, so that the magnetic tape is fed toward the supply reel table depending upon the rotation of the capstan axle. At this time, the pendulum gear engages the supply reel table via its idler gear so that the supply reel table rotates counterclockwise for winding the magnetic tape thereon.

In this way, the recording and/or reproducing apparatus may operate in a forward or reverse reproduction mode, in which the recording and/or reproducing apparatus may indicate an image on a television's picture plane by reading picture signals by means of a rotary head drum while the magnetic tape travels in the first or second direction.

In a case where the recording and/or reproducing apparatus operates in a FF/REW mode, the magnetic tape is drawn into a tape cassette, and thereafter the capstan motor rotates clockwise or counterclockwise so that the supply or take-up reel table rotates for winding the magnetic tape onto the corresponding reel table in the aforementioned manner. In this case, the voltage or electrical current applied to the capstan motor is so controlled that the it rotates at a higher speed than in the forward or reverse reproduction mode.

However, in the aforementioned conventional recording and/or reproducing apparatus, although the rewinding time of the magnetic tape onto the reel table can be short, there is a disadvantage in that the switching time from the FF/REW mode to the forward or reverse reproduction mode is relatively long since the magnetic tape is housed within the tape cassette in the FF/REW mode.

That is, when the operation mode of the recording and/or reproducing apparatus is switched from the FF/REW mode to the forward or reverse reproduction mode, it is required that the magnetic tape is drawn out of the tape cassette so as to form a given tape traveling path. There is a disadvantage in that forming such a tape traveling path is time consuming.

If the magnetic tape is wound onto the reel table at a high speed in the FF/REW mode while it is arranged in the tape loaded condition, i.e. it is arranged in the tape traveling path, then there is a disadvantage in that the rotation speed of the reel table can not be so high since the surface of the magnetic tape will be damaged, and undue wear to the magnetic head(s) of the VCR will be caused.

SUMMARY OF THE INVENTION

It is therefore a principal object of the present invention to eliminate the aforementioned disadvantage and to provide a system for supplying driving force to a recording and/or reproducing apparatus, which can perform the tape forwarding or rewinding in two tape arrangements, one of which is a tape loaded condition in which a tape is arranged along a usual tape traveling path, and the other of which is a tape unloaded condition in which the tape is arranged at a location other than the tape traveling path, or is housed within a tape cassette.

It is another object of the invention to provide a system for supplying driving force to a recording and/or reproducing apparatus which can selectively operate in a forward or reverse reproduction mode, a FF/REW mode, or a high-speed FF/REW mode.

It is another object of the invention to provide a mechanism for transmitting driving force to a recording and/or reproducing apparatus which can change the decelerating ratio of a gear train arranged between a driving source and a supply or take-up reel table.

It is a further object of the invention to provide a mechanism for transmitting driving force to a recording and/or reproducing apparatus, in which a torque limiter can be applied to a gear train arranged between a driving source and a supply or take-up reel table.

In order to accomplish the aforementioned and other objects, a system for supplying driving force to a recording and/or reproducing apparatus includes a first gear train which causes a supply or take-up reel table to rotate at a first speed, and a second gear train which causes the supply or take-up reel table to rotate at a second speed higher than the first speed. Preferably, the system is provided with a torque limiter between a driving source and the first or second gear train.

According to one aspect of the present invention, a system for supplying driving force to a recording and/or reproducing apparatus which has a first reel table onto which tape traveling in a first direction is wound, and a second reel table onto which tape traveling in a second direction, opposite the first direction is wound, comprises:

driving means for producing driving force;

a first gear train for selectively transmitting the driving force produced by the driving means to one of the first and second reel tables in a first operation mode so as to cause the selected first or second reel table to rotate at a first speed;

a second gear train for transmitting the driving force produced by the driving means to the first reel table in a second operation mode so as to cause the first reel table to rotate at a second speed higher than the first speed; and switching means for selecting one of the first and second operation modes to cause the selected first or second gear train to transmit driving force to the corresponding reel table.

The system may further comprise tape feeding means for causing the tape to selectively travel in the first or second direction when tape drawn out of a cassette loaded into the recording and/or reproducing apparatus is positioned in the tape loaded position. The first gear train may transmit the driving force to the selected first or second reel table when the tape drawn out of the cassette is positioned in the tape loaded position. The second gear train may transmit the driving force to the first reel table when the tape is positioned in the tape unloaded position, a position other than the tape loaded position. The tape feeding means may include an axle caused to rotate by the driving means, and a roller which is movable between a first position in which the roller makes thrusting contact with the axle via the tape of the tape loaded position, and a second position in which the roller is separated from the axle by a predetermined distance, the roller being rotatable depending on the rotation of the axle and tightly holding the drawn tape between the axle and the roller so as to cause the drawn tape to travel in the first or second direction when the roller is positioned in the first position. The first gear train may transmit the driving force to the selected first or second reel table when the roller is positioned in the second position.

The driving means may produce rotation force which may be selectively transmitted to one of the first and second gear trains. The decelerating ratio of the second gear train is preferably less than that of the first gear train. The first gear train may include a driving gear arranged between the first and second reel tables, pendulum gear engaging the driving gear, and a first and second idler gears which engage corresponding gear portions of the first or second reel tables, the pendulum gear being movable for engaging one of the first and second idler gears depending upon the rotation of the driving gear in the first operation mode. In addition, the second gear train may include the driving gear, an intermediate gear engaging the driving gear, and the first idler gear, the intermediate gear engaging the first idler gear in the second operation mode. The system may further comprise means for preventing the pendulum gear from engaging gear portions of either first or second reel tables in the second operation mode. The first idler gear may include a smaller gear member which is engageable with the intermediate gear, and a larger gear member which is engageable with the gear portion of the first reel table, the diameter of the larger gear member being greater than that of the smaller gear member. The intermediate gear is movable between an upper position in which the intermediate gear disengages from the smaller gear member of the first idler gear, and a lower position in which the intermediate gear engages the smaller gear member.

According to another aspect of the present invention, a system for supplying driving force to a recording and/or reproducing apparatus which has a first reel table onto which a tape traveling in a first direction is wound, and a second reel table onto which tape traveling in a second direction opposite the first direction is wound, comprises:

driving means for producing driving force;

a first gear train for selectively transmitting the driving force produced by the driving means to one of the first and second reel tables in a first operation mode so as to cause the selected first or second reel table to rotate at a first speed;

a second gear train for selectively transmitting the driving force produced by the driving means to one of the first and second reel tables in a second operation mode so as to cause the selected first or second reel table to rotate at a second speed higher than the first speed; and switching means for selecting one of the first and second operation modes to cause the selected first or second gear train to transmit the driving force to the corresponding reel table.

According to another aspect of the present invention, a system for supplying driving force to a recording and/or reproducing apparatus which has a first reel table onto which tape traveling in a first direction is wound, and a second reel table onto which tape traveling in a second direction opposite the first direction is wound, comprises:

driving means for producing driving force;

a driving gear arranged between the first and second reel tables, the driving gear being caused to rotate by the driving means;

first and second idler gears which respectively engage corresponding gear portions of the first and second reel tables;

a pendulum gear which engages the driving gear and is movable for engaging one of the first and second idler gears depending upon the rotation of the driving gear in a first operation mode, the pendulum gear being cooperated with the driving gear and the engaged gear portion of the first and second reel tables to form a first gear train for transmitting driving force to the corresponding one of the first and second reel tables in the first operation mode so as to cause the corresponding reel table to rotate at a first speed;

an intermediate gear which engages the driving gear and is movable for engaging the first idler gear in a second operation mode, the intermediate gear being cooperated with the driving gear and the first idler gear to form a second gear train for transmitting driving force to the first reel table so as to cause the first reel table to rotate at a second speed higher than the first speed; and switching means for selecting one of the first and second operation modes to cause one of the first and second gear trains to form.

The system may further comprise tape feeding means for causing the tape to selectively travel in the first or second direction when tape, drawn out of a cassette, loaded in the recording and/or reproducing apparatus is positioned in a tape loaded position. The gear train may be formed when the tape drawn out of the cassette is positioned in the tape loaded position. The second gear train may be formed when the tape is positioned at a tape unloaded position other than the tape loaded position. The tape feeding means may include an axle which is caused to rotate by the driving means, and a roller which is movable between a thrust position in which the roller makes thrusting contact with the axle via the tape in the tape loaded position, and a separated position in which the roller is separated from the axle by a predetermined distance, the rotation of the roller depending upon the rotation of the axle and causing the drawn tape to travel between the axle and the roller in the first or second direction when the roller is positioned in the thrusting position. The first gear train may transmit the driving force to the selected one of the first and second reel tables when the roller is positioned in the separated position. The decelerating ratio of the first gear train is preferably greater than that of the second gear train.

According to another aspect of the present invention, a mechanism for selectively transmitting driving force produced by a driving source to either a first reel table onto which tape traveling in a first direction is wound, or a second reel table onto which tape traveling in a second direction, opposite the first direction, is wound, for a recording and/or reproducing apparatus, comprises:

a gear train means for selectively transmitting driving force from the driving source to one of the first and second reel tables so as to cause the selected reel table to rotate at a first speed, the gear train means selectively establishing either a first gear train which causes the selected reel table to rotate at a first speed, and a second gear train which causes the selected reel table to rotate at a second speed higher than the first speed;

switching means for causing the gear train means to establish one of the first and second gear trains;

torque limiter means, selectively applied to the first gear train, for decreasing the driving force transmitted to the selected reel table so as to decrease the rotation speed of the selected reel table depending upon a load applied to the gear train means;

torque limiter applying means for causing the torque limiter means to be applied to the first gear train; and mode selecting means, associated with the switching means and the torque limiter applying means, for selecting either a first operation mode in which the first gear train is established and the torque limiter means is applied to the first gear train, a second operation mode in which the first gear train is established without applying the torque limiter means to the first gear train, or a third operation mode in which the second gear train is established.

The mode selecting means is preferably a sliding lever which may control the switching means and the torque limiter applying means. The first gear train may include a driving gear arranged between the first and second reel tables, a pendulum gear engaging the driving gear, and first and second idler gears which engage corresponding gear portions of the first and second reel tables, the pendulum gear being movable for engaging one of the first and second idler gears depending upon the rotation of the driving gear in either the first or second operation mode. The second gear train may include the driving gear, an intermediate gear engaging the driving gear, and the first idler gear, the intermediate gear engaging the first idler gear in the third operation mode. The mechanism may further comprise means for preventing the pendulum gear from engaging gear portions of either first or second reel tables in the third operation mode. The torque limiter means may include a fixed gear which is rotatable together with the driving gear, a limiter gear which is rotatable together with the driving gear when load applied to the driving gear is relatively low, and a mode switching gear which is movable between a torque limiting and non-limiting positions in which the mode switching gear respectively engages the limiter and fixed gears to transmit the driving force produced by the driving source to the driving gear, the limiter gear transmitting the driving force to the driving gear so that the rotation speed of the driving gear decreases as the load applied to the driving gear becomes greater. The first idler gear may include a smaller gear member which is engageable with the intermediate gear, and a greater gear member which engages the gear portion of the first reel table, the diameter of the greater gear member being greater than that of the smaller gear member. The intermediate gear may be movable between an upper position in which the intermediate gear disengages from the first idler gear, and a lower position in which the intermediate gear engages the smaller gear member of the first idler gear. The mode selecting means may select one of the first, second and third operation modes by selecting the positions of the intermediate gear and the third gear of the torque limiter means. The mode selecting means is preferably a sliding member which is slidable between a first position in which the sliding member causes the mode switching gear to be positioned at the torque limiting position so as to establish engagement between the mode switching gear and the limiter gear while causing the intermediate gear to be positioned at the upper position so as to block the engagement between the intermediate gear and the first idler gear, a second position in which the sliding member causes the mode switching gear to be positioned in the non-torque limiting position so as to establish engagement between the mode switching gear and the fixed gear while causing the intermediate gear to be positioned at the upper position so as to block the engagement between the intermediate gear and the first idler gear, and a third position in which the sliding member causes the mode switching gear to be positioned at the torque non-limiting position so as to establish the engagement between the mode switching gear and the fixed gear while causing the intermediate gear to be positioned in the lower position so as to establish engagement between the intermediate gear and the smaller gear member of the first idler gear.

BRIEF DESCRIPTION OF THE DRAWINGS

The present invention will be understood more fully from the detailed description given herebelow and from the accompanying drawings of the preferred embodiment of the invention. However, the drawings are not intended to imply limitation of the invention to a specific embodiment, but are for explanation and understanding only.

In the drawings:

FIG. 4 is an exploded perspective view of a major part of the recording and/or reproducing apparatus of FIG. 1; and FIGS. 5(A) to 5(C) are sectional views similar to FIG. 3, which indicate a high-speed REW mode, a FF/REW mode and a forward or reverse reproduction mode, respectively.

DESCRIPTION OF THE PREFERRED EMBODIMENT

A recording and/or reproducing apparatus, according to the present invention, will be described herebelow in terms of the preferred embodiments in order to facilitate a better understanding of the present invention. The recording and/or reproducing apparatus of the preferred embodiment is designed to record on and reproduce from a novel, recently proposed magnetic tape cassette specifically designed for PCM audio recording and/or reproduction. However, the present invention will be applicable not only to that specific PCM audio recording magnetic tape cassette but also any magnetic tape cassette which has the same or a similar cassette structure.

The recording and/or reproducing apparatus, according to the present invention, may selectively operate in forward or reverse reproduction modes. Throughout the disclosure, the forward and reverse reproduction modes mean modes in which the recording and/or reproducing apparatus may indicate an image on a television's picture plane by reading picture signals by means of a rotary head drum while the magnetic tape travels in forward and reverse directions, respectively.

Because of the rather complicated structure of the preferred embodiments, the following disclosure will be made in terms of separate groups of components. Throughout the disclosure, the word "front", "rear", "right" and "left" used with respect to the recording and/or reproducing apparatus mean the bottom and top, and the right and left sides of FIG. 1.

Figure 1:
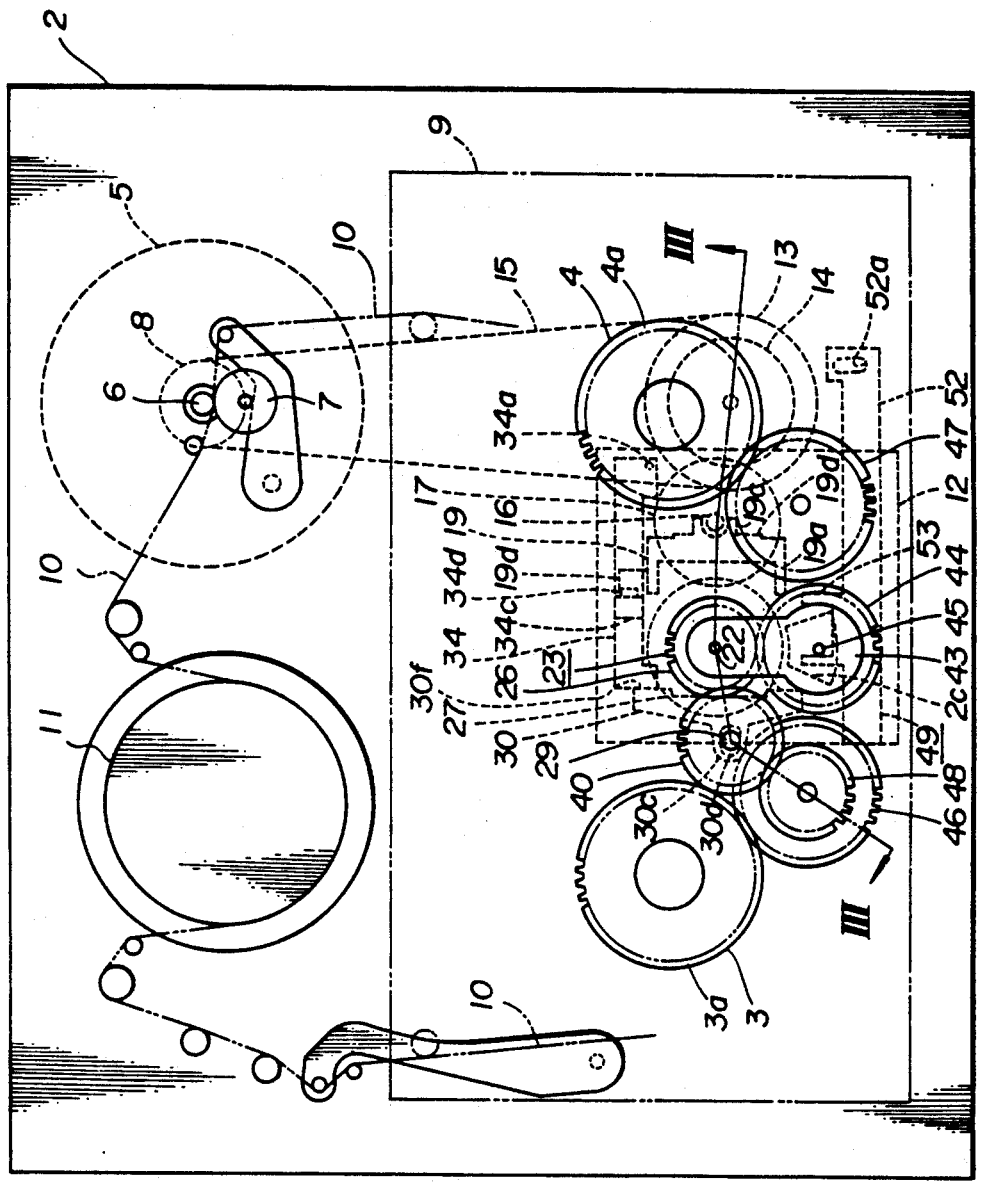
FIG. 1 is a schematic plan view of a recording and/or reproducing apparatus according to the present invention.

Schematic Construction of Recording and/or Reproducing Apparatus (FIG. 1)

Referring now to the drawings, particularly to FIG. 1, a recording and/or reproducing apparatus 1, such as a video tape recorder, includes an essentially rectangular mechanical chassis 2. A pair of reel tables, i.e. supply and take-up reel tables 3 and 4, are respectively arranged on the upper surface of the mechanical chassis 2 on the front-right and front-left sides of the center thereof so as to be separated from each other by a predetermined distance. The supply and take-up reel tables 3 and 4 are rotatably supported on the mechanical chassis 2, and have respectively reel gears 3a and 4a on the respective periphery thereof.

A capstan motor 5 is mounted on the lower surface of the mechanical chassis 2 at a location behind of the take-up reel table 4. An axle 6 for supplying output of the capstan motor 5, which will be referred to as a "capstan axle" hereinafter, passes through an opening formed in the mechanical chassis 2 so as to project upwards from the upper surface thereof.

A pinch roller 7 is rotatably mounted on the upper surface of the mechanical chassis 2 and so arranged as to face the capstan axle 6. The pinch roller 7 is designed to tightly thrust against the capstan axle 6 in order to cause magnetic tape to travel when the recording and/or reproducing apparatus 1 operates in a reproducing mode in which picture signals are reproduced.

A driving pulley 8 is arranged on the lower surface of the mechanical chassis 2 and fixed to the capstan axle 6 so as to rotate depending upon the rotation of the capstan axle 6.

When a magnetic tape cassette 9 is loaded in the recording and/or reproducing apparatus 1 at a predetermined position, a magnetic tape 10 housed within the magnetic tape cassette 9 is designed to be drawn out and wound onto a rotary head drum 11 at a predetermined tape-wrap angle. In addition, the magnetic tape 10 is designed to be guided by various tape guides so as to form a given tape traveling path.

Driving Mechanism (FIGS. 1 to 5)

A sub-plate 12 is arranged on the lower surface of the mechanical chassis 2 at a location beneath between the supply and take-up reel tables 3 and 4. As can be seen clearly from FIG. 3, the sub-plate 12 is fixed to the lower surface of the mechanical chassis 2 so as to form a space therebetween, and supports various gears thereon.

As shown in FIG. 1, a driven pulley 13 is also arranged on the lower surface of the mechanical chassis at a location beneath a slightly forward position of the take-up reel table 4, and is rotatably supported on the mechanical chassis 2. As can be seen clearly from FIG. 3, a spur gear 14, which has a slightly smaller diameter than that of the driven pulley 13, is arranged on the upper surface of the driven pulley 13. The spur gear 14 is integrally formed with the driven pulley 13. Furthermore, the driven pulley is arranged at essentially the same height as that of the driving pulley 8, so that the rotation force of the driving pulley 8 is transmitted to the driven pulley 13 via a belt 15.

Switching Mechanism (FIGS. 2 to 5)

Figure 3:
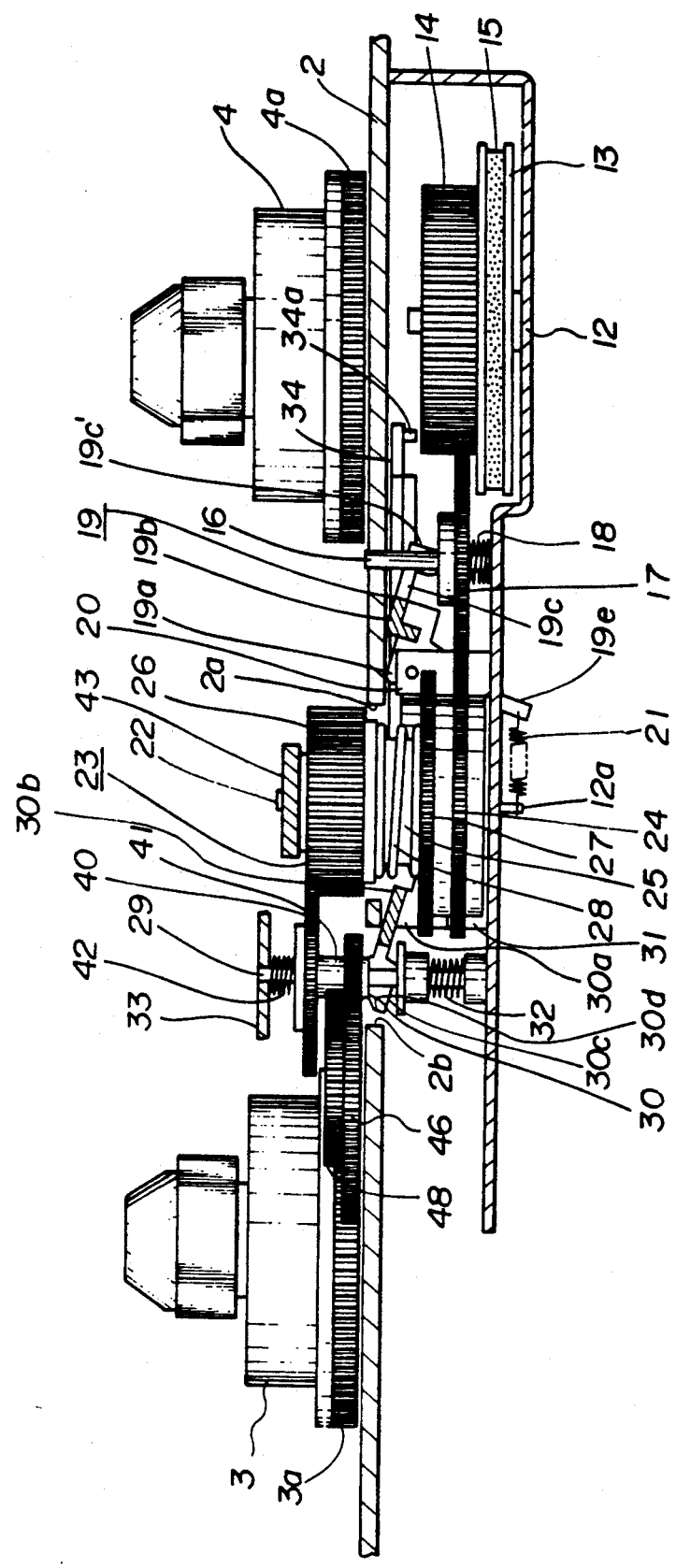
FIG. 3 is a sectional view of the recording and/or reproducing apparatus taken along the line III—III of FIG. 1.

As shown in FIG. 3, a vertically extending supporting shaft 16 is arranged on the left side of the driven pulley 13, and is supported on the upper surface of the sub-plate 12. A mode switching gear 17 is rotatably supported on the supporting shaft 16 and is movable upwards and downwards along the axis of the supporting shaft 16. The mode switching gear 17 is designed to always engage the spur gear 14. In addition, a coil spring 18 is provided around the supporting shaft 16 between the sub-plate 12 and the mode switching gear 17 so that the mode switching gear 17 is biased upwards.

As can be seen clearly from FIG. 4, a thrusting member 19 having an essentially U-shaped cross-section is provided for thrusting the mode switching gear 17 downwards against the force of the coil spring 18 to maintain the latter at a predetermined position. The thrusting member 19 generally comprises a pair of arm portions 19a and a base portion 19b. The arm portions 19a of the thrusting member 19 are pivotably supported on a pair of supporting pieces 20 which are respectively arranged on the sub-plate 12 at locations neighboring the mode switching gear 17 so as to extend upwards from the upper surface of the sub-plate 12. The base portion 19b extends between the free ends of the arm portions, and has a pair of arm pieces 19c at essentially the center thereof. The arm pieces 19c are separated from each other at a predetermined distance and extend to the right in FIG. 3 from the base portion 19b. Each of the arm pieces 19c has a thrusting portion 19c' which extends from the end thereof in an essentially perpendicular direction to the axis of the respective arm piece 19c. The ends of the thrusting portions 19c' of the arm pieces 19c are designed to thrust the mode switching gear 17 downwards at locations neighboring the rotation axis of the mode switching gear 17. The thrusting member 19 has also a pushed piece 19d which is integrally formed with the rearward arm portion 19a. The pushed piece 19d extends rearwards from the lower edge of the rearward arm portion 19a. As will be described hereinafter, a sliding member 34 is designed to push against the pushed piece 19d. The thrusting member 19 has also a spring supporting piece 19e which is integrally formed with the pushed piece 19d. The spring supporting piece 19e extends downwards from the left edge of the pushed piece 19d, and passes through an opening formed in the sub-plate 12 so as to project from the lower surface thereof.

In addition, the end of the spring supporting piece 19e is connected to one end of an extension spring 21, the other end of which is connected to a spring supporting portion 12a extending downwards from the lower surface of the sub-plate 12, so that the extension spring 21 biases the thrusting portions 19c' of the arm pieces 19c downwards. In this way, the thrusting portions 19c' are designed to thrust the mode switching gear 17 downwards. As will be described hereinafter, when the sliding member 34 thrusts the pushed portion 19d in the right direction, the thrusting member 19 pivots counterclockwise in FIGS. 5(A) to 5(C) so that the thrusting portions 19c' disengage from the mode switching gear 17 to release the downward thrusting force to the latter. When the mode switching gear 17 disengages from the thrusting portions 19c', it is designed to move upwards by the force of the coil spring 18. In this way, the mode switching gear 17 can move between a lower position in which it is urged toward the sub-plate 12 by means of the thrusting member 19, and an upper position in which it is urged upwards by means of the coil spring 18.

In addition, a supporting shaft 22 is fixed to the sub-plate 12 at essentially the center thereof. The supporting shaft 22 extends upwards and rotatably supports a driving gear assembly 23.

The driving gear assembly 23 generally comprises a lower spur gear 24, a rotary sleeve member 25 which extends upwards from the center of the upper surface of the lower spur gear 24, an upper spur gear 26 which is integrally formed on the upper end of the rotary sleeve member 25, and a limiter gear 27 which is rotatably mounted on the rotary sleeve member 25. As can be seen clearly from FIG. 3, a compression coil spring 28 is arranged between the limiter gear 27 and the upper spur gear 26. In addition, a felt member (not shown) is arranged between the limiter gear 27 and the lower spur gear 24. When load applied to the driving gear assembly 23 is relatively low, the limiter gear 27 is designed to rotate together with the lower and upper spur gears 24 and 26. As the load becomes greater, the limiter gear 27 is designed to slide on the sleeve member 25 so as to produce different rotation speeds between the limiter gear 27 and the lower spur gear 24, and between the limiter gear 27 and the upper spur gear 26.

The upper spur gear 26 of the driving gear assembly 23 is relatively thick, and the great part thereof passes through an opening 2a formed in the mechanical chassis 2 to project from the upper surface of the mechanical chassis 2.

When the mode switching gear 17 is positioned at its lower position, it engages the lower spur gear 24, and when it is positioned at its upper position, it engages the limiter gear 27.

Furthermore, a supporting shaft 29 is fixed to the sub-plate 12 at a location neighboring the left edge thereof. The supporting shaft 29 extends upwards from the sub-plate 12, and the end thereof passes through an opening 2b formed in the mechanical chassis 2 on the left side of the opening 2a, to project from the upper surface of the mechanical chassis 2.

As can be seen clearly from FIG. 4, a thrusting member 30 having an essentially U-shaped cross-section is provided for moving an intermediate gear 40 which will be described hereinafter. The thrusting member 30 generally comprises a pair of arm portions 30a and a base portion 30b. The arm portions 30a are pivotably supported on a pair of supporting pieces 31 which are respectively arranged on the sub-plate 12 at the front-left and rear-left sides of the driving gear assembly 23 so as to extend upwards from the upper surface of the sub-plate 12. The base portion 30b extends between the free ends of the arm portions 30a, and is integrally formed with a thrusting piece 30c at a location slightly before the center thereof. The thrusting piece 30c extends from the base portion 30b, and has an elongated through opening 30d, through which the supporting shaft 29 is designed to pass.

Figure 5A:
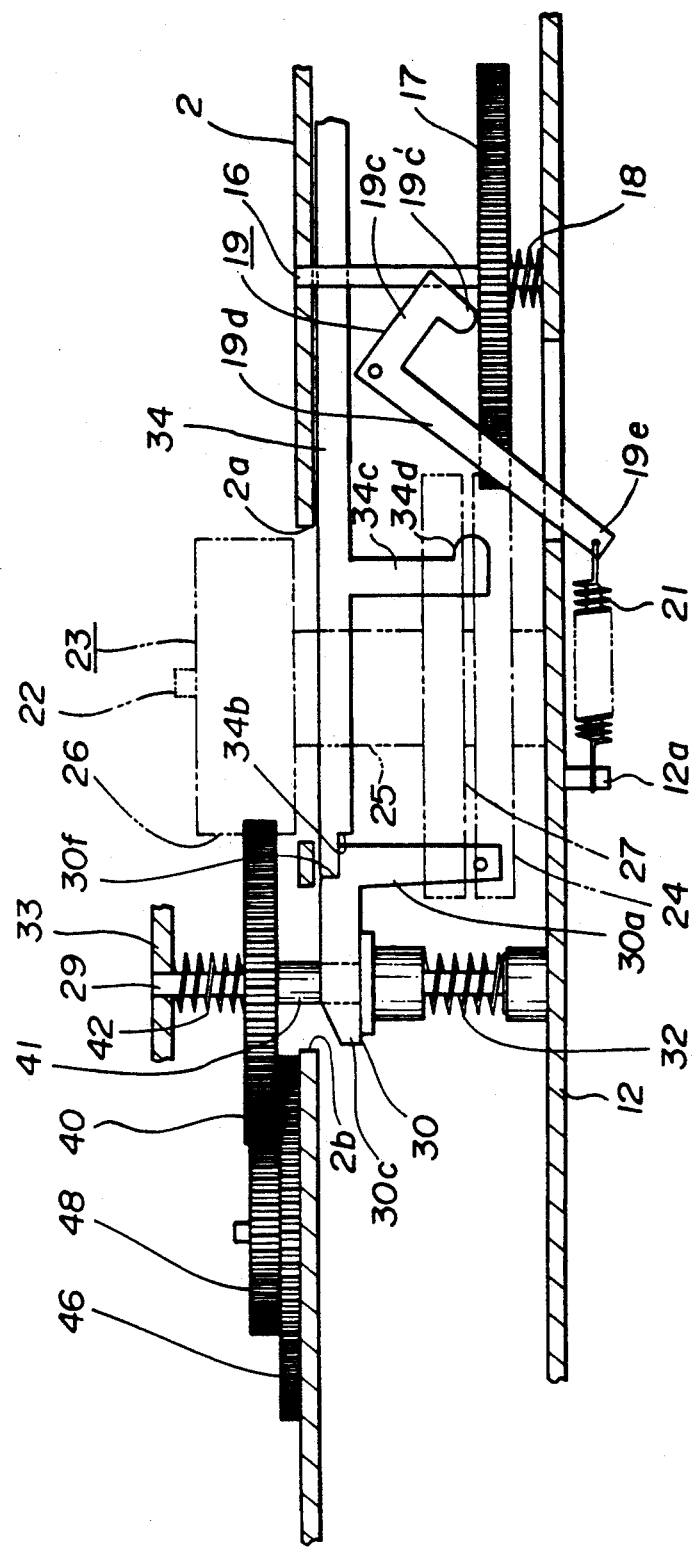
Figure 5B:
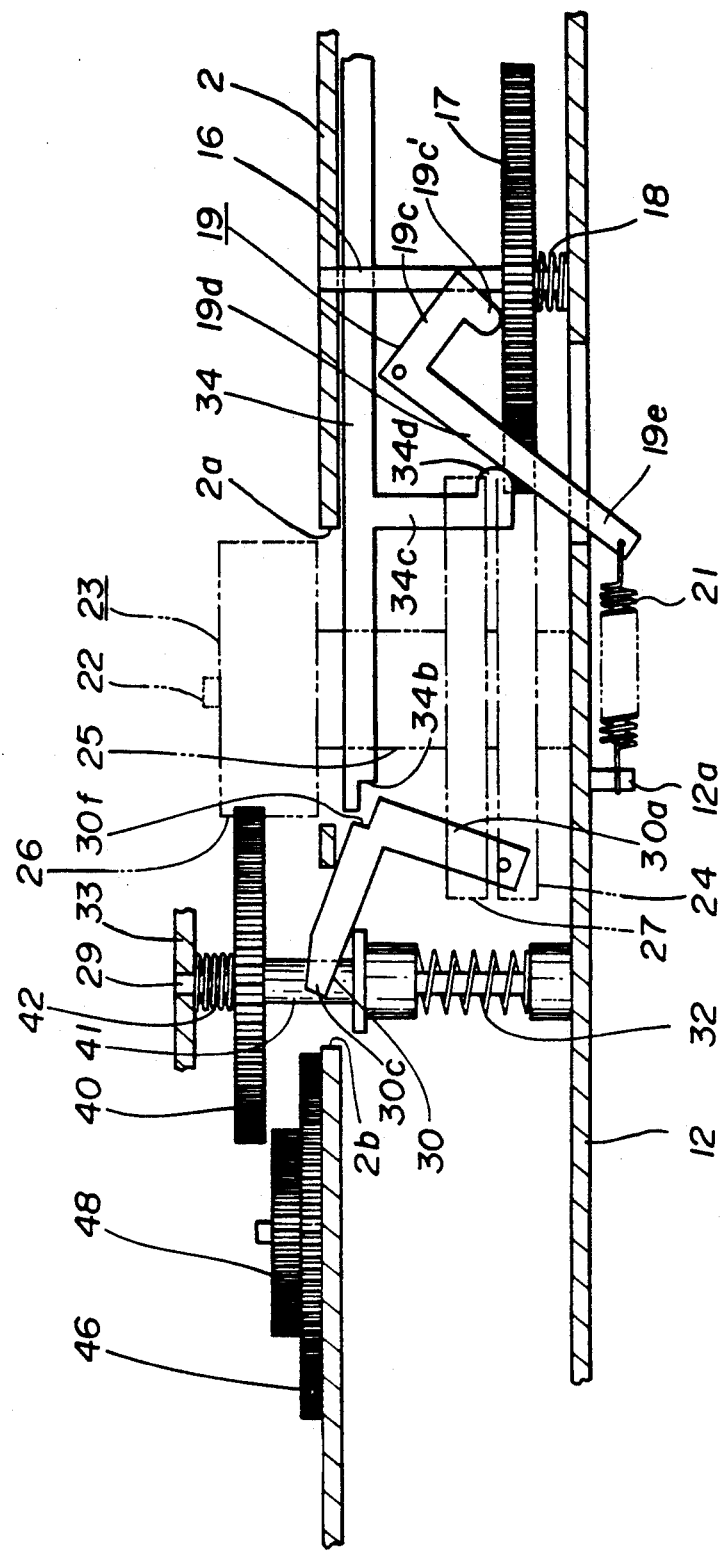

The thrusting member 30 is so biased as to rotate clockwise in FIGS. 5(A) to 5(C) by means of a compression coil spring 32 which is arranged between the lower surface of the thrusting piece 30c and the sub-plate 12.

As can be seen clearly from FIG. 4, the rearward arm portion 30a of the thrusting member 30 is provided with a stopper piece 30e which extends to the right from the lower-right edge of the rearward arm portion 30a, as right is viewed in FIG. 1. When the thrusting member 30 rotates clockwise, the stopper piece 30e comes into contact with the upper surface of the sub-plate 12 to prevent the thrusting member 30 from rotating excessively. One of the arm portions 30a is formed with a step 30f at the upper-right edge the step serving as a pushed portion. As will be described hereinafter, the sliding member 34 is designed to thrust against the step 30f.

The top end of the supporting shaft 29 is supported on a supporting plate 33 which is arranged to be separated from the mechanical chassis 2 by a predetermined distance.

As will be described hereinafter, the intermediate gear 40 is rotatably supported on the supporting shaft 29 at a location above the thrusting piece 30c, so as to be movable along the supporting shaft 29 in the upward and downward directions. The intermediate gear 40 is designed to be held at an upper position when the thrusting piece 30c rotates clockwise in FIGS. 5(A) to 5(C) due to the force of the compression coil spring 32, and to be held at a lower position when the thrusting piece 30c rotates counterclockwise in FIGS. 5(A) to 5(C) by means of the sliding member 34.

The sliding member 34 is arranged beneath the mechanical chassis 2 at a location beneath and between the supply and take-up reel tables 3 and 4, at a location behind a line between the rotation axes of the reel tables 3 and 4. The sliding member 34 is supported on the mechanical chassis 2 so as to be slidable in the left and right directions. The right end of the sliding member 34 is integrally formed with a connecting projection 34a which projects downwards from the lower surface thereof. The left end of the sliding member 34 is formed with a step 34b serving as a first thrusting portion for thrusting the pushed portion 30f of the thrusting member 30. The sliding member 34 is also integrally formed with a thrusting piece 34c which projects downwards from the lower surface thereof, slightly left of center. The thrusting piece 34c has a second thrusting portion 34d which extends from the lower edge thereof so as to face the pushed portion 19d of the thrusting member 19.

The distance between the first and second thrusting portions 34b and 34d is essentially similar to or slightly smaller than the distance between the pushed portion 19d when the thrusting member 19 thrusts the mode switching gear 17 downwards, and the pushed portion 30f when the thrusting member 30 thrusts the intermediate gear 40 upwards.

Figure 2:
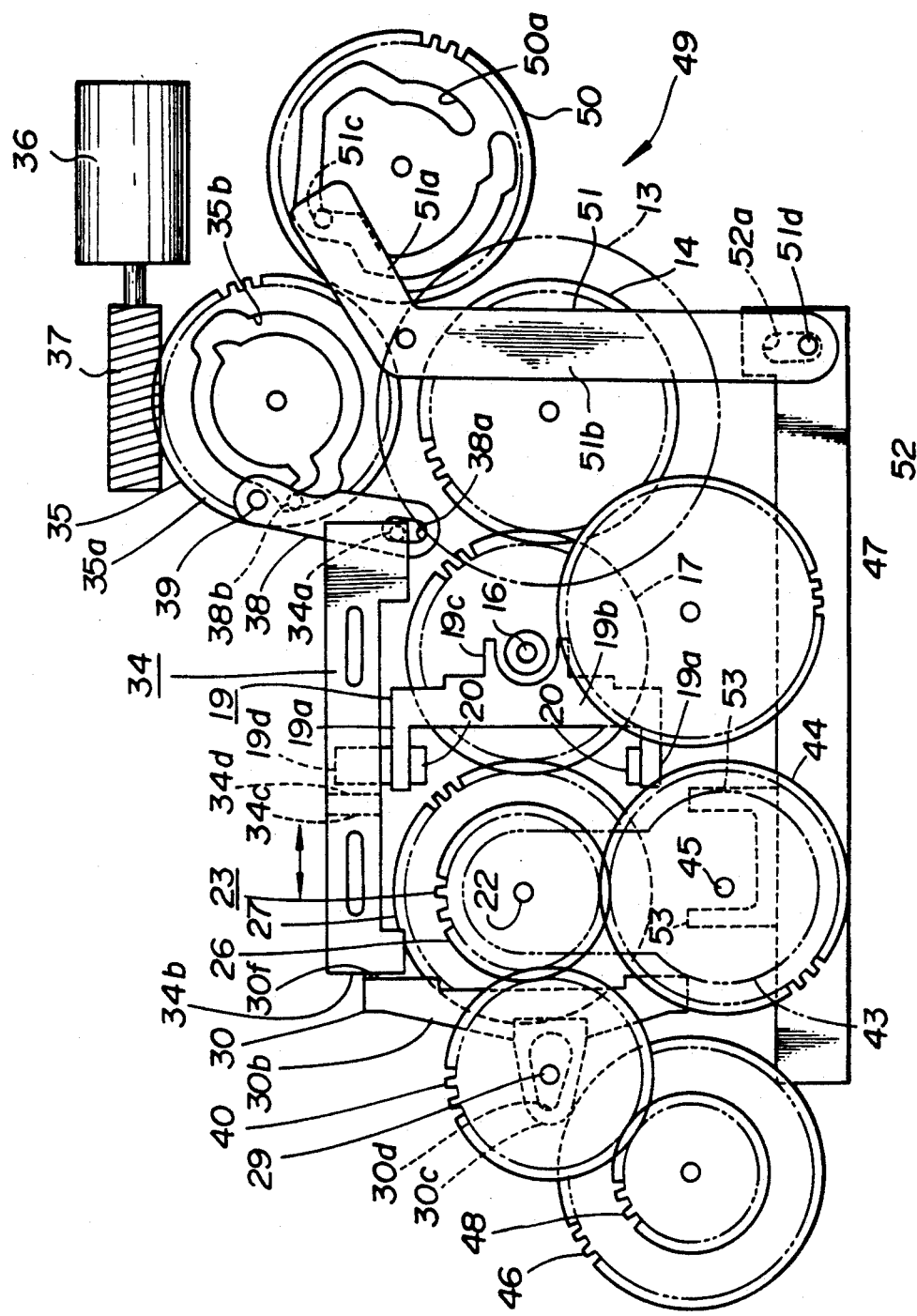
FIG. 2 is a plan view of a major part of the recording and/or reproducing apparatus of FIG. 1.

As shown in FIG. 2, a cam gear 35 is rotatably supported on the mechanical chassis 2 at a location beneath a position behind the take-up reel table 4. The cam gear 35 is designed to be driven by means of a mode selecting motor 36 mounted on the lower surface of the mechanical chassis 2, via a worm gear 37. The cam gear 35 has a wheel gear portion 35a which engages the worm gear 37 connected to the output shaft of the mode selecting motor 36. The cam gear 35 has also a cam groove 35b on the upper surface thereof.

An oscillating lever 38 is arranged on the lower side of the mechanical chassis 2, and is rotatably supported on a supporting shaft 39 which projects from the cam gear 35. The oscillating lever 38 has, at the free end thereof, an elongated through opening 38a which extends along the axis of the oscillating lever 38. The oscillating lever 38 is integrally formed with a pin 38b which projects downwards from the lower surface of the oscillating lever 38 at a location between the center of the oscillating lever 38 and the rotation axis thereof.

The pin 38b of the oscillating lever 38 slidably engages the cam groove 35b of the cam gear 35, and the connecting projection 34a of the sliding member 34 slidably engages the elongated through opening 38a of the oscillating lever 38.

When the cam gear 35 rotates, via the worm gear 37, depending upon the rotation of the mode selecting motor 36, the pin 38b of the oscillating lever 38 moves along the cam groove 35b, so that the oscillating lever 38 oscillates, whereby the sliding member 34 slides in right and left directions.

The sliding member 34 is movable between a left position in which the first thrusting portion 34b thereof thrusts the pushed portion 30f of the thrusting member 30 in the left direction so that the thrusting member 30 rotates counterclockwise as shown in FIG. 5(A), and which will be referred to as "position A", and a right position in which the second thrusting portion 34d of the sliding member 34 thrusts the pushed portion 19d of the thrusting member 19 in the right direction so that the thrusting member 19 rotates counterclockwise and the thrusting portions 19c' thereof release the mode switching gear 17 from the pushed downwards position as shown in FIG. 5(C), which will be referred to as a "position C". Between the A position and the C position, the sliding member 34 can be positioned at a neutral position in which both of the first and second thrusting portions 34b and 34d thereof are respectively disengaged from the pushed portions 30f and 19d of the thrusting members 30 and 19 as shown in FIG. 5(B), this will be referred to as a "position B".

As mentioned above, the intermediate gear 40 is rotatably supported by the upper portion of the supporting shaft 29 so as to be movable in the upward and downward directions. The intermediate gear 40 is integrally formed with a sleeve member 41 which extends downwards from the center portion of the lower surface thereof. The lower end surface of the sleeve member 41 is supported on the thrusting member 30c of the thrusting member 30 around the elongated through opening 30d. The intermediate gear 40 is biased downwards by means of a compression coil spring 42 arranged between the upper surface of the intermediate gear 40 and the lower surface of the supporting plate 33.

The resiliency of the compression coil spring 42 is designed to be less than that of the compression coil spring 32 arranged around the supporting shaft 29 at the lower portion thereof, so that the intermediate gear 40 is held at its upper position when the sliding member 34 is positioned in the B or C positions in which the first thrusting portion 34b of the sliding member 34 is disengaged from the pushed portion 34f of the thrusting member 30.

The intermediate gear 40 always engages the upper spur gear 26 of the driving gear assembly 23 when it is positioned at either the upper or lower position.

An oscillating lever 43 is pivotably supported on the supporting shaft 22 of the driving gear assembly 23. The oscillating lever 43 is arranged on the upper side of the upper spur gear 26, and has a supporting shaft 45 which extends downwards from the free end of the oscillating lever 43. The supporting shaft 45 of the oscillating lever 43 rotatably supports a pendulum gear 44 which engages the upper spur gear 26. The lower end of the supporting shaft 45 passes through an essentially rectangular opening 2c formed in the mechanical chassis 2, essentially centered between the reel tables 3 and 4, so as to project downwards from the lower surface of the mechanical chassis 2.

The reel gears 3a and 4a of reel tables 3 and 4 respectively engage idler gears 46 and 47 which are rotataby supported on the upper surface of the mechanical chassis 2. The pendulum gear 44 can move between the idler gears 46 and 47 to engage one of the idler gears 46 and 47. When the pendulum gear 44 is positioned at an essentially intermediate location between the idler gears 46 and 47, the pendulum gear 44 is designed not to engage either of the idler gears 46 or 47.

The idler gear 46 engaging the supply reel gear 3a is integrally formed with a smaller-diameter spur gear 48 which is arranged on the upper surface of the idler gear 46 so as to be coaxial with the idler gear 46. The spur gear 48 is designed to engage the intermediate gear 40 when the latter is positioned in its lower position.

Oscillation Preventing Mechanism (FIG. 2)

The recording and/or reproducing apparatus 1 is provided with an oscillation preventing mechanism 49 for preventing the pendulum gear 44 from oscillating. The oscillation preventing mechanism 49 generally comprises a cam gear 50, an oscillating link 51, a sliding member 52 and so forth.

The cam gear 50 comprises a spur gear, one surface of which is formed with a cam groove 50a. The cam gear 50 is rotatably supported on the lower surface of the mechanical chassis 2 so that the cam groove 50a faces the lower surface of the mechanical chassis 2. The cam gear 50 is designed to rotate by means of the mode selecting motor 36 via a gear train (not shown).

The oscillating link 51 has an essentially L-shaped structure which comprises a shorter arm 51a and a longer arm 51b. The bent portion of the oscillating link 51 is rotatably supported on the lower surface of the mechanical chassis 2 at a location neighboring the cam gear 50 so that the oscillating link 51 can oscillate along the lower surface of the mechanical chassis 2. The shorter arm 51a of the oscillating link 51 extends from the oscillating axis in a right-rear direction so that the end thereof is arranged between the cam gear 50 and the mechanical chassis 2. The longer arm 51b extends from the oscillating axis in an essentially forward direction.

The end of the shorter arm 51a of the oscillating link 51 is integrally formed with a pin 51c which projects downwards and engages the cam groove 50a of the cam gear 50. On the other hand, the end of the longer arm 51b is integrally formed with a connecting pin 51d which projects downwards and engages the sliding member 52 as will be described hereinafter.

When the cam gear 50 rotates by means of the mode selecting motor 36 via the gear train (not shown), the pin 51c of the shorter arm 51a of the oscillating link 51 moves along the cam groove 50a, so that the connecting pin 51d of the longer arm 51b oscillates in an essentially lateral direction.

The sliding member 52 is made of a synthetic resin, and is supported on the lower surface of the mechanical chassis 2 at a location neighboring the front edge thereof so as to be slidable in an essentially lateral direction. One end of the sliding member 52 is formed with a slightly elongated opening 52a which extends in the width direction of the sliding member 52. The connecting pin 51d of the longer arm 51b of the oscillating link 51 slidably engages the elongated opening 52a. The other end of the sliding member 52 extends toward the through opening 2c, and is integrally formed with a pair of thrusting pieces 53 which project rearwards. Between the thrusting pieces 53, the lower end of the supporting shaft 45 of the pendulum gear 44 is arranged.

When the oscillating link 51 oscillates by means of the mode selecting motor 36, the sliding member 52 slides laterally so that the thrusting pieces 53 cause the supporting shaft 45 of the pendulum gear 44 to move to control the oscillating action of the pendulum gear 44.

Operation in Forward and Reverse Reproduction Mode, FF/REW Mode, and High-Speed REW Mode (FIGS. 5(A) to 5(C))

In a case where one of the operation modes of the recording and/or reproducing apparatus 1 is selected, the mode selecting motor 36 rotates to cause the cam gears 35 or 50 to rotate so as to set-up the selected operation mode.

When the forward or reverse reproduction mode is selected, the cam gear 35 causes the sliding member 34 to move from the position B to the position C as shown in FIG. 5(C). In this position, the second thrusting portion 34d thrusts the pushed portion 19d of the thrusting member 19 in the right direction, so that the thrusting portions 19c' move upwards, whereby the mode switching gear 17 moves upwards due to the force of the compression coil spring 18. As a result, the mode selecting gear 17 engages the limiter gear 27 of the driving gear assembly 23.

At this time, in the case of the forward reproduction mode, the capstan motor 5 rotates counterclockwise so that the capstan axle 6 cooperates with the pinch roller 7 to feed the magnetic tape 10 toward the take-up reel table 4. In addition, the rotation force of the capstan motor 5 is transmitted to the upper spur gear 26 of the driving gear assembly 23 via the driving pulley 8, the belt 15, the driven pulley 13, the spur gear 14, the mode switching gear 17 and the limiter gear 27, so that the upper spur gear 26 rotates counterclockwise. As a result, the oscillating lever 43 moves toward the take-up reel table 4 and engages the take-up idler gear 47 to cause the take-up reel table 4 to rotate clockwise so that the magnetic tape 10 fed by the capstan axle 6 and the pinch roller 7 is wound onto the take-up reel table 4.

On the other hand, in the case of the reverse reproduction mode, the capstan motor 5 rotates reversely or clockwise so that the magnetic tape 10 is fed toward the supply reel table 3. At this time, all of the aforementioned pulleys and gears rotate reversely to the aforementioned forward reproduction mode, so that the pendulum gear 44 moves toward the supply reel table 3, whereby the magnetic tape 10 is wound onto the supply reel table 3.

Furthermore, in the forward or reverse reproduction mode, the thrusting pieces 53 of the sliding member 52 are positioned so as not to thrust the supporting shaft 45 of the pendulum gear 44, so that the pendulum gear 44 can move in a predetermined direction depending upon the direction of rotation of the driving gear assembly 23.

The recording and/or reproducing apparatus 1 may also selectively operate in a FF/REW mode or a high-speed FF/REW mode. In the FF/REW mode, the magnetic tape 10 is fed to either the take-up or supply reel table under a tape loaded condition, i.e. a condition in which the pinch roller 7 is separated from the capstan axle 6 while the magnetic tape 10 is being drawn out of the tape cassette 9 to form the tape traveling path. In the high-speed FF/REW mode, the magnetic tape 10 is fed to either the take-up or supply reel table under a tape unloaded condition, i.e. a condition in which the magnetic tape 10 is housed within the tape cassette 9.

When the FF/REW mode is selected, the pinch roller 7 is separated from the capstan axle 6 while the tape traveling path formed by the drawn magnetic tape 10 is not changed. In this condition, the cam gear 35 causes the sliding member 34 to be positioned at the position B as shown in FIG. 5(B). At this position, neither the first thrusting portion 34b nor the second thrusting portion 34d thrusts the respective pushed portion 30f and 19d of the thrusting member 30 and 19. Therefore, the mode switching gear 17 moves downwards, and the intermediate gear 40 is held at the upper position.

As a result, the mode switching gear 17 engages the lower spur gear 24 of the driving gear assembly 23, so as to form a first gear train comprising the upper spur gear 26 of the driving gear assembly 23, the pendulum gear 44 and idler gear 46 or 47. In this condition, when the capstan motor 5 rotates, the rotation force thereof is transmitted to the first gear train via the driving pulley 8, the belt 15, the driven pulley 13, the spur gear 14, the mode switching gear 17 and the lower spur gear 24 of the driving gear assembly 23. In this way, magnetic tape 10 can be wound onto reel tables 3 or 4 in the FF/REW mode.

When the high-speed REW mode is selected, the magnetic tape 10 is housed within the tape cassette 9. In this condition, the cam gear 35 causes the sliding member 34 to be positioned at the position A as shown in FIG. 5(A). At this position, the first thrusting portion 34b of the sliding member 34 thrusts the pushed portion 30f of the thrusting member 30 in the left direction, so that the thrusting member 30 rotates counterclockwise, whereby the thrusting piece 30c thereof moves downwards. As a result, the intermediate gear 40 moves downwards to its lower position due to the force of the compression coil spring 42, so as to engage the spur gear 48 integrally formed on the idler gear 46.

In this way, a second gear train comprising the upper spur gear 26 of the driving gear assembly 23, the intermediate gear 40, the spur gear 48 and the idler gear 46 is formed. In this condition, when the capstan motor 5 rotates clockwise, the rotation force is transmitted to the second gear train, so that the magnetic tape 10 can be wound onto the supply reel table 3 in the high-speed REW mode.

In this case, in order to prevent the oscillating lever 43 from rotating due to the rotation of the driving gear assembly 23 and to prevent the pendulum gear 44 from engaging the idler gear 46, the sliding member 52 is controlled by means of the cam gear 50 so that the thrusting piece 53 of the sliding member 52 causes the supporting shaft 45 of the pendulum gear 44 to be positioned at its neutral position.

As mentioned above, in the second gear train, the spur gear 48 having a smaller diameter than that of the idler gear 46 is integrally formed on the idler gear 46, and the intermediate gear 40 causes the smaller-diameter spur gear 48 to rotate. Therefore, the decelerating ratio of the second gear train used in the high-speed REW mode is smaller than that of the first gear train used in the FF/REW mode. As a result, if the rotation speed of the capstan axle 5 in the FF/REW mode is the same as that in the high-speed REW mode, the supply reel table 3 can rotate at a higher speed in the high-speed REW mode than in the FF/REW mode.

As mentioned above, in the recording and/or reproducing apparatus according to the present invention, forwarding or rewinding of the magnetic tape can be performed under any one of two conditions, i.e. tape loaded and unloaded conditions. In the FF/REW mode, although the traveling speed of the magnetic tape is not so high, mode switching time to the forward or reverse reproduction mode is shorter. On the other hand, in the high-speed FF/REW mode, the time required for forwarding or rewinding magnetic tape is shorter. In addition, these modes can be achieved without providing any complex mechanisms.

In the shown embodiment, although only the high-speed REW mode is described when the magnetic tape is wound onto the reel table at a higher speed, a high-speed FF mode or both a high-speed FF and a high-speed REW mode can be also formed by means of the aforementioned transmitting mechanism.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention as set out in the appended claims.

What is claimed is:

1. A system for supplying a driving force to a recording and/or reproducing apparatus which has a first reel table onto which a tape traveling in a first direction is wound, and a second reel table onto which the tape traveling in a second direction, opposite to the first direction, is wound, said system comprising;

driving means for producing driving force;
   a first gear train for selectively transmitting the driving force produced by the driving means to one of the first and second reel tables in a first operation mode so as to cause the selected first or second reel table to rotate at a first speed;
   a second gear train for transmitting the driving force produced by the driving means to the first reel table in a second operation mode so as to cause the first reel table to rotate at a second speed higher than the first speed;
   switching means for selecting one of said first and second operation modes to cause the selected first or second gear train to transmit the driving force to the corresponding reel table; and
   tape feeding means for causing the tape to selectively travel in the first or second direction when the tape, which is drawn out of a cassette loaded in the recording and/or reproducing apparatus, is positioned in a tape loaded position;
   wherein said driving means produces a rotational force which is selectively transmitted to one of the first and second gear trains;
   wherein said first gear train includes a driving gear arranged between the first and second reel tables, a pendulum gear engaging the driving gear, and first and second idler gears which engage corresponding gear portions of the first and second reel tables, said pendulum gear being movable for engaging one of the first and second idler gears depending upon the rotation of the driving gear in said first operation mode, and wherein said second gear train includes the driving gear, an intermediate gear engaging the driving gear, and the first idler gear, said intermediate gear being axially movable along an axis about which it is rotatable for selectively engaging the first idler gear in the second operation mode.

2. A system as set forth in claim 1, wherein said first gear train transmits the driving force to the selected first or second reel table when the tape drawn out of the cassette is positioned in the tape loaded position.

3. A system as set forth in claim 2, wherein said second gear train transmits the driving force to the first reel table when the tape is positioned in a tape unloaded position different from the tape loaded position.

4. A system a set forth in claim 3, wherein said tape feeding means includes an axle driven to rotate by said driving means, and a rotatable roller which is movable between a first position in which the roller makes thrusting contact with the axle via the tape in the tape loaded position, and a second position in which the roller is separated from the axle by a predetermined distance.

5. A system as set forth in claim 4, wherein said first gear train transmits the driving force to the selected first or second reel table when said roller is positioned in the second position.

6. A system as set forth in claim 1, which further comprises means for preventing the pendulum gear from engaging gear portions of either the first or second reel tables in the second operation mode.

7. A system as set forth in claim 1, wherein said first idler gear includes a smaller gear member which is engageable with said intermediate gear, and a larger gear member which is engageable with said gear portion of the first reel table, the diameter of said larger gear member being greater than that of said smaller gear member.

8. A system as set forth in claim 7, wherein said intermediate gear is movable between an upper position in which the intermediate gear disengages from the smaller gear member of the first idler gear, and a lower position in which the intermediate gear engages the smaller gear member.

9. A system for supplying a driving force to a recording and/or reproducing apparatus which has a first reel table onto which tape traveling in a first direction in wound, and a second reel table onto which tape traveling in a second direction opposite to the first direction is wound, said system comprising:
   driving means for producing a driving force;
   a driving gear arranged between said first and second reel tables, said driving gear being caused to rotate by said driving means;
   first and second idler gears which respectively engage corresponding gear portions of said first and second reel tables;
   a pendulum gear which engages the driving gear and is movable for engaging one of the first and second idler gears depending upon the rotation of the driving gear in a first operation mode, said pendulum gear being cooperated with the driving gear and the engaged gear portion of the first and second reel tables to form a first gear train for transmitting the driving force to one of the first and second reel tables in the first operation mode so as to cause the selected reel table to rotate at a first speed;
   an intermediate gear which engages said driving gear and is axially movable along an axis about which it is rotatable for engaging the first idler gear in a second operation mode, said intermediate gear being cooperated with the driving gear and the first idler gear to form a second gear train for transmitting driving force to the first reel table so as to cause the first reel table to rotate at a second speed higher than the first speed; and
   switching means for selecting one of the first and second operation modes to cause one of the first and second gear trains to form.

10. A system as set forth in claim 9, which further comprises tape feeding means for causing the tape to selectively travel in the first or second direction when tape, which is drawn out of a cassette loaded in the recording and/or reproducing apparatus, is positioned in a tape loaded position.

11. A system as set forth in claim 10, wherein said first gear train is formed when the tape drawn out of the cassette is positioned in the tape loaded position.

12. A system as set forth in claim 11, wherein said second gear train is formed when the tape is positioned in a tape unloaded position different from said tape loaded position.

13. A system as set forth in claim 12, wherein said tape feeding means includes an axle caused to rotate by said driving means, and a rotatable roller which is movable between a thrusting position in which the roller makes thrusting contact with the axle via the tape in the tape loaded position, and a separated position in which the roller is separated from the axle by a predetermined distance.

14. A system as set forth in claim 13, wherein said first gear train transmits the driving force to the selected one of said first and second reel tables when said roller is positioned at the separated position.

15. A system as set forth in claim 9, wherein the decelerating ratio of said first gear train is greater than that of said second gear train.

16. An apparatus for selectively transmitting a driving force produced by a driving source to either a first reel table onto which a tape traveling in a first direction is wound, or a second reel table onto which the tape traveling in a second direction, opposite the first direction, is wound, for a recording and/or reproducing apparatus, said mechanism comprising:
   gear train means for selectively transmitting the driving force from the driving source to one of said first and second reel tables, said gear train means selectively establishing one of a first gear train which causes the selected reel table to rotate at a first speed, and a second gear train which causes the selected reel table to rotate at a second speed higher than the first speed;
   switching means for causing said gear train means to establish one of said first and second gear trains;
   torque limiter means, selectively applied to said first gear train, for decreasing the driving force to be transmitted to the selected reel table so as to decrease the rotation speed of the selected reel table depending upon load applied to said gear train means;
   torque limiter applying means for causing said torque limiter means to be applied to said first gear train; and
   mode selecting means, associated with said switching means and said torque limiter applying means, for selecting either a first operation mode in which the first gear train is established and the torque limiter means is applied to said first gear train, or a second operation mode in which the first gear train is established without applying the torque limiter means to the first gear train, or a third operation mode in which the second gear train is established;
   wherein said first gear train includes a driving gear arranged between the first and second rear tables, a pendulum gear engaging the driving gear, and first and second idler gears which engage corresponding gear portions of said first and second reel tables, said pendulum gear being movable for engaging one of the first and second idler gears depending upon the rotation of said driving gear in either said first or said second operation mode, and wherein said second gear train includes said driving gear, an intermediate gear engaging the driving gear, and the first idler gear, said intermediate gear being axially displaceable along an axis about which it is rotatable for engaging the first idler gear in said third operation mode.

17. An apparatus as set forth in claim 16, which further comprises means for preventing the pendulum gear from engaging gear portions of either first or second reel tables in said third operation mode.

18. An apparatus as set forth in claim 16, wherein said torque limited means includes:
   a fixed gear which is rotatable with said driving gear,
   a limiter gear; said limiter gear being operatively connected with said driving gear so as to be synchronously rotatable therewith until a load applied to the driving gear reaches a predetermined level after which a rotational speed difference is permitted to occur between said limiter gear and said driving gear, and a mode switching gear which is axially displaceable along the axis about which it is rotatable between a torque limiting position in which the mode switching gear engages the limiter gear and a non-torque limiting position in which the mode switching gear engages the fixed gear to transmit the driving force produced by said driving source to said driving gear.

19. An apparatus as set forth in claim 18, wherein said first idler gear includes a smaller gear member which is engageable with said intermediate gear, and a greater gear member which engages said gear portion of the first reel table, the diameter of said greater gear member being greater than that of said smaller gear member.

20. An apparatus as set forth in claim 19, wherein said intermediate gear is movable between an upper position in which the intermediate gear is disengaged from said first idler gear, and a lower position in which the intermediate gear engages said smaller gear member of the first idler gear.

21. An apparatus as set forth in claim 20, wherein said mode selecting means selects one of the first, second and third operation modes by setting the positions of said intermediate gear and the third gear of said torque limiter means.

22. An apparatus as set forth in claim 21, wherein said mode selecting means is a sliding member which is slidable between a first position in which the sliding member causes said mode switching gear to be positioned at said non-torque-limiting position so as to establish engagement between the mode switching gear and said limiter gear while causing said intermediate gear to be positioned in the upper position so as to block engagement between the intermediate gear and said first idler gear, and a second position in which the sliding member causes said mode switching gear lo be positioned in said non-torque-limiting position so as to establish engagement between the mode switching gear and said fixed gear while causing said intermediate gear to be positioned at the upper position so as to block engagement between the intermediate gear and the first idler gear, and a third position in which the sliding member causes said mode switching gear to be positioned at said non-torque-limiting position so as to establish engagement between the mode switching gear and said fixed gear while causing said intermediate gear to be positioned in the lower position so as to establish engagement between said intermediate gear and said smaller gear member of the first idler gear.

23. An apparatus for selectively transmitting a driving force produced by a driving source to either a first reel table onto which a tape traveling in a first direction is wound, or a second reel table onto which the tape traveling in a second direction, opposite the first direction, is wound, for a recording and/or reproducing apparatus, said mechanism comprising:

gear train means for selectively transmitting the driving force from the driving source to one of said first and second reel tables, said gear train means selectively establishing one of a first gear train which causes the selected reel table to rotate at a first speed, and a second gear train which causes the selected reel table to rotate at a second speed higher than the first speed;

switching means for causing said gear train means to establish one of said first and second gear trains;

torque limiter means, selectively applied to said first gear train, for decreasing the driving force to be transmitted to the selected reel table so as to decrease the rotation speed of the selected reel table depending upon load applied to said gear train means;

torque limiter applying means for causing said torque limiter means to be applied to said first gear train; and mode selecting means, associated with said switching means and said torque limiter applying means, for selecting either a first operation mode in which the first gear train is established and the torque limiter means is applied to said first gear train, or a second operation mode in which the first gear train is established without applying the torque limiter means to the first gear train, or a third operation mode in which the second gear train is established;

wherein said first gear train includes a driving gear arranged between the first and second reel tables, a pendulum gear engaging the driving gear, and first and second idler gears which engage corresponding gear portions of said first and second reel tables, said pendulum gear being movable for engaging one of the first and second idler gears depending upon the rotation of said driving gear in either said first or said second operation mode, and wherein said second gear train includes said driving gear, and the first idler gear, said intermediate gear engaging the first idler gear in said third operation mode, said intermediate gear being axially displaceable along an axis about which it is displaceable;

wherein said torque limiter means includes:

a fixed gear which is rotatable with said driving gear, a limiter gear; said limiter gear being operatively connected with said driving gear so as to be synchronously rotatable therewith until a load applied to the driving gear reaches a predetermined level after which a rotational speed difference is permitted to occur between said limiter gear and said driving gear, and a mode switching gear which is axially displaceable along the axis about which it is rotatable between a torque limiting position in which the mode switching gear engages the limiter gear and a non-torque limiting position in which the mode switching gear engages the fixed gear to transmit the driving force produced by said driving source to said driving gear;

wherein said switching means comprises:

a selectively operable electric motor;

a cam which is in drive connection with said selectively operable electric motor;

a slidable member operatively connected with said cam; and first and second pivotal levers, said first and second pivotal levers being engageable with said slidable member in a manner which induces pivotal movement therein, said first and second levels being engageable with said intermediate gear and said mode switching gear, respectively to induce axial displacement thereof.

24. A system for supplying a driving force to a recording and/or reproducing apparatus which has a first reel table onto which a tape traveling in a first direction is wound, and a second reel table onto which the tape traveling in a second direction, opposite to the first direction, is wound, said system comprising;

driving means for producing driving force;

a first gear train for selectively transmitting the driving force produced by the driving means to one of the first and second reel tables in a first operation mode so as to cause the selected first or second reel table to rotate at a first speed;

a second gear train for transmitting the driving force produced by the driving means to the first reel table in a second operation mode so as to cause the first reel table to rotate at a second speed higher than the first speed; and switching means for selecting one of said first and second operation modes to cause the selected first or second gear train to transmit the driving force to the corresponding reel table;

wherein said switching means comprises:

a selectively operable electric motor;

a first cam which is in drive connection with said selectively operable electric motor;

a slidable member operatively connected with said first cam;

first and second pivotal levers, said first and second pivotal levers being engageable with said slidable member in a manner which induces pivotal movement therein; and first and second gears which are axially displaceable along the axes about which they are respectively rotatable, said first and second gears being axially displaceable in response to the pivotal movement of said first and second pivotal levers, respectively, for selectively forming one of said first and second gear trains.

25. A system set forth in claim 24, further comprising:

a second cam in drive connection with said selectively operable electric motor; and linkage means operatively interconnecting said second cam with said first gear train for selectively preventing said first gear train from establishing a drive connection with either of said first and second reel tables.

* * * * *